United States Patent Office 3,096,339
Patented July 2, 1963

3,096,339
SELECTED NEGATIVELY SUBSTITUTED
MALEIMIDE DYES
Elmore L. Martin, Wilmington, Del., assignor to E. I. du Pont de Nemours and Company, Wilmington, Del., a corporation of Delaware
No Drawing. Filed Feb. 19, 1959, Ser. No. 794,239
8 Claims. (Cl. 260—310)

This invention is concerned with a new class of dyes and more particularly with substituted 3-pyrrolines, such as the substituted maleimides and related derivatives and with their preparation.

In dye chemistry, it is desirable to have available a class of chemically related compounds which, by variation within the class, can provide a broad range of colors. Such a class has the advantage that the several members may be applied by similar dyeing techniques, and thus a whole family of colors may be made available with a minimum of application variations.

It is an object of this invention to provide a new class of dyes, the colors of which cover substantially the entire range of the visible spectrum. A further object is to provide substituted maleimide dyes and methods for their preparation. Other objects will appear hereinafter.

These and other objects of this invention are obtained by providing 2,5-dichalcogen-3-pyrrolines in which the chalcogens have an atomic number less than 17 (i.e., oxygen or sulfur) and wherein the extranuclear valence of one of the unsaturated ring carbons is satisfied by carbon of a radical Q, where Q may be

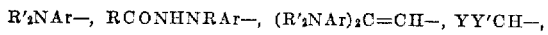

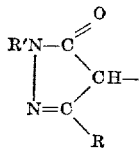

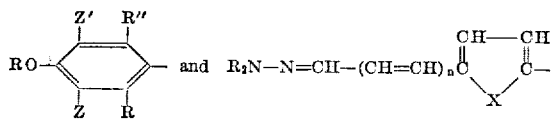

in which Ar is arylene; R and R'' are hydrogen or hydrocarbyl; R' contains only carbon and hydrogen and the hetero atoms of the functional group named and is hydrocarbyl, β-alkoxyethyl, β-acyloxyethyl, β-cyanoethyl or β-trialkylammoniumethyl halide; X is O, S, or NR; Y and Y' are —CN, —COOR, —COR, —CONR$_2$, —CSNR$_2$, —SO$_2$R, —NO$_2$, —NR$_3$⁺, or —SR$_2$⁺; Z is alkyl, halogen, —SO$_3$Na, or Y; Z' is hydrogen or Z, and taken together with R'' and the carbons to which Z' and R'' are attached is the benzene ring; and $n$ is 0 or 1.

The preparation of members of the above class of 2,5-dichalcogen-3-pyrrolines involves the reaction of the corresponding 1-R-3-(or 4-)chloro-2,5-dichalcogen-3-pyrrolines with compounds QH where Q and R are as defined above. In the process of this invention it is not necessary to isolate the chloro starting materials indicated above. As illustrated in Examples III, IV, and IX, which follow, the chloro intermediates can be used for preparation of the dyes without isolating them from the media in which they are prepared. The chloro compounds are conveniently prepared by treating the sodium salt of the corresponding hydroxy compound with a strong inorganic acid chloride such as POCl$_3$ or thionyl chloride or such similar acting organic compounds as oxalyl chloride, benzotrichloride, or benzenesulfonyl chloride.

The products of this invention can be illustrated by the formula

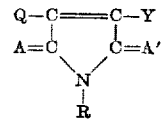

where A and A' are chalcogens of atomic number less than 17, i.e., oxygen or sulfur, and Q, R, and Y are as defined above. Preferably, the upper limit for carbon atoms present in each of the groups represented by R, R', R'' and Ar is 20. It is to be understood that in a given compound the several embodiments of R and R' that may be involved may be the same or different, respectively.

A preferred class of dyes of the present invention are those of the above formula in which A and A' are either both oxygen or one oxygen and one sulfur, and of these a still more preferred group are those in which Q is R'$_2$NAr—,

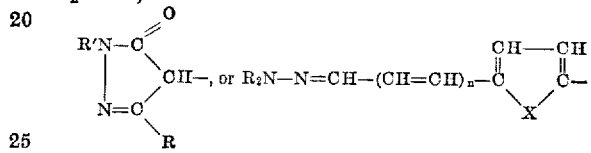

and especially preferred are such dyes wherein Y is a cyano group and R attached to ring nitrogen is hydrogen.

As indicated by the wide variations in the examples which follow, there are no process variables which appear critical. As shown in Examples III, IV, and IX, it suffices to bring the reactants together and no auxiliary materials are required.

It is convenient, although not essential, to employ as a reaction medium an organic solvent which is inert to the reactants and products. Thus, there can be employed aliphatic or aromatic hydrocarbons, alcohols, dialkyl ethers, cyclic ethers, such as dioxane and tetrahydrofuran, esters, such as methyl acetate, ethyl acetate and ethyl butyrate, N,N-dimethylformamide, N,N-diethylformamide, N-methylformanilide, N-methylformamide, formamide, N-methyl-N-ethyl-acetamide, N,N-dimethylacetamide, N,N-diethylacetamide, tetramethylurea, N-nitrosodimethylamine, tetraethylurea, pyridine, dimethylsulfoxide, acetonitrile, and mixtures of these liquids. Esters and alkyl nitriles are the preferred class of solvents. Since the reaction of this process is mildly exothermic, the use of an inert reaction medium facilitates dissipation of the heat of reaction.

The temperature at which the reaction of this invention is carried out may be varied widely, for example, from temperatures below 0° C. up to the decomposition temperature of the reactants or products. In general, however, it is preferred to operate in the range of 0–200° C., and best yields are obtained when operating in the range of 20–100° C.

The reaction of a 3-(or 4-)chloro-2,5-dichalcogen-3-pyrroline with a compound QH according to this invention takes place between equimolecular quantities of the reactants. However, this in no way limits the molar proportions of these reactants which may be brought together within the limits of the process. The relative amounts may be varied widely, say, for example, from molar ratios of 19:1 to 1:19. However, highest yields are obtained when approximately equimolar quantities are employed.

Pressure is not a critical variable in this process, and atmospheric pressure is ordinarily preferred for convenience, although pressures above or below atmospheric are operable.

In the following illustrative examples, parts are by weight unless otherwise indicated. Example II represents a preferred embodiment of the invention.

EXAMPLE I

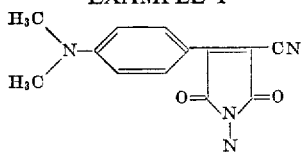

To a solution of five parts of N,N-dimethylaniline in about 14 parts of dimethylformamide is added 2 parts of 2-chloro-3-cyanomaleimide. The mixture becomes warm with the instantaneous formation of a deep red color. After 10 minutes, the solution is diluted with 10 parts of water, and the dark precipitate of 3-cyano-4-(p-N,N-dimethylaminophenyl)-2,5-dioxo-3 - pyrroline which forms is collected by filtration. A small portion is dissolved in ethanol to give a magenta solution. When this solution is made basic with 10% sodium hydroxide, the color becomes orange, but the magenta color is regenerated by acidifying with 5% hydrochloric acid. After 10 hours in alkali, the dye can still be regenerated.

EXAMPLE II

A solution of 15.6 parts of 2-chloro-3-cyanomaleimide and 12.4 parts of N,N-dimethylaniline in 225 parts of ethyl acetate is stirred for 2 hours, and the red crystalline product is collected by filtration. Yield 18.2 parts (74%) of 3-cyano-4-(p-N,N-dimethylaminophenyl)-2,5-dioxo-3-pyrroline. Purification is effected by recrystallization from glacial acetic acid. An ethanol solution of this dye shows an absorption maximum at 518 millimicrons, with a molecular extinction coefficient of 24,300.

*Analysis.*—Calc'd. for $C_{13}H_{11}N_3O_2$: C, 64.47; H, 4.54; N, 17.36. Found: C, 64.76; H, 4.62; N, 17.53.

Dyeing A

The use of 3-cyano-4-(p-N,N-dimethylaminophenyl)-2,5-dioxo-3-pyrroline, prepared as in Example II above, as a dye is shown as follows. A solution of 2 parts of a sulfonated lignin dispersant and about 5 parts of glacial acetic acid in 7000 parts of hot water is prepared. To this is added a solution of 2 parts of 3-cyano-4-(p-N,N-dimethylaminophenyl)-2,5-dioxo-3-pyrroline in 95 parts of dimethylformamide. Ten-part swatches of fabrics of cellulose acetate, nylon, silk and wool are added and the dye bath is boiled for 30 minutes. The fabrics are rinsed in water and dried. The cellulose acetate is dyed a bright purple, nylon a bright red, silk a medium purple and wool a deep purple color.

EXAMPLE III

Fifty parts of the sodium salt of 2-carbamyl-3-hydroxy-maleimide, 191 parts of N,N-dimethylaniline and about 25 parts of phosphorus oxychloride are heated together in a glass reactor at about 80° C. for a few minutes. The solution turns deep red in color with the formation of 3-cyano-4-(p-N,N-dimethylaminophenyl)-2,5-dioxo-3-pyrroline.

EXAMPLE IV

Fifty parts of the sodium salt of 2-cyano-3-hydroxy-maleimide, 191 parts of N,N-dimethylaniline and about 21 parts of p-toluenesulfonyl chloride are heated together in a glass reactor at about 80° C. for a few minutes. The solution turns deep red in color with the formation of 3-cyano-4-(p-N,N-dimethylaminophenyl)-2,5-dioxo-3-pyrroline.

EXAMPLE V

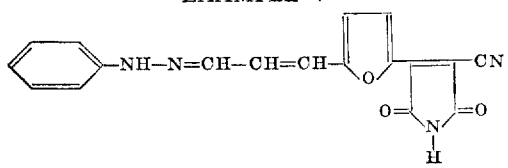

The process of Example I is repeated substituting furylacrolein phenylhydrazone for N,N-dimethylaniline. 3 - cyano - 2,5 - dioxo - 4 - [5 - (3 - phenylhydrazonopropenyl)-2-furyl]-3-pyrroline separates as a blue dye.

EXAMPLE VI

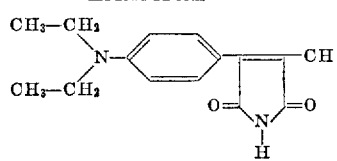

The process of Example I is repeated substituting N,N-diethylaniline for N,N-dimethylaniline. 3-cyano-4-(p-N,N-diethylaminophenyl)-2,5-dioxo-3-pyrroline separates as a red dye.

EXAMPLE VII

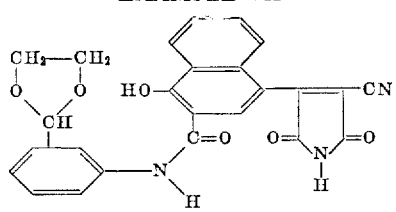

The process of Example I is repeated substituting m-(1-hydroxy-2-naphthamido)benzaldehyde ethylene glycol acetal for N,N-dimethylaniline. 3-cyano-2,5-dioxo-4-[3 - N - (m - 2 - dioxolanylphenyl)carbamyl - 4 - hydroxy-1-naphthyl]-3-pyrroline separates as a purple dye.

EXAMPLE VIII

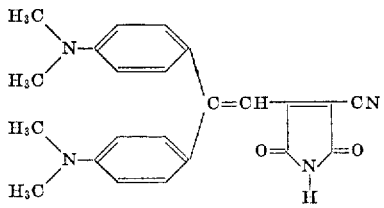

The process of Example I is repeated substituting 1,1-bis(p-dimethylaminophenyl)ethylene for N,N-dimethylaniline. 3 - cyano - 4 - [2,2 - bis - (p - N,N - dimethylaminophenyl)-vinyl]-2,5-dioxo-3-pyrroline separates as a purple dye.

EXAMPLE IX

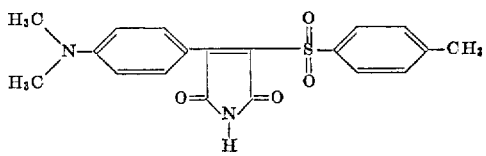

Fifty parts of the sodium salt of 2-hydroxy-3-(p-tolylsulfonyl)maleimide, 191 parts of N,N-dimethylaniline and about 21 parts of p-toluenesulfonyl chloride are heated together in a glass reactor at about 80° C. for a few minutes. The solution turns deep red in color with the formation of 3-(p-N,N-dimethylaminophenyl)-2,5-dioxo-4-(p-toluenesulfonyl)-3-pyrroline.

EXAMPLE X

To a mechanically stirred solution of 16.6 parts of dichloromaleimide in 95 parts of dimethylformamide is added 24 parts of N,N-dimethylaniline followed by the addition of 17.8 parts of finely powdered, anhydrous sodium p-toluene-sulfinate in small portions. The temperature rises to 50° C. during the addition of the sulfinate and is maintained at 50–55° C. for an additional period of 5 minutes after the addition of the sulfinate. After cooling to room temperature, the reaction mixture is diluted with petroleum ether and ice water. A gummy mass separates that crystallizes when stirred with a small amount of ether. The crude dye is dissolved in methylene chloride. The solution is concentrated to a small volume, and anhydrous ether is added. The 3-(p-N,N-dimethylaminophenyl) -2,5- dioxo- (p - toluenesulfonyl) -3-pyrroline separates as an oil that soon solidifies. Crystallization from a mixture of methanol and methylene chloride gives 5 parts of black prisms melting at 214–216° C. The molecular extinction coefficient in methylene chloride at 532 millimicrons is 23,700. The compound dyes cellulose acetate and polyethylene terephthalate fibers purple, nylon, silk, and wool fibers shades of brown.

*Analysis.*—Calc'd. for $C_{19}H_{18}O_4N_2S$: C, 61.59; H, 4.90; N, 7.57. Found: C, 61.55; H, 4.98; N, 7.35.

EXAMPLE XI

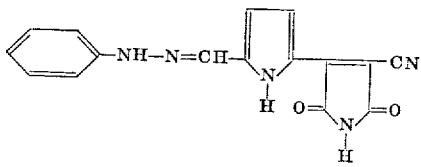

Four parts of 2-chloro-3-cyanomaleimide and 4.7 parts of pyrrole-2-aldehyde phenylhydrazone are dissolved in 55 parts of dimethyl sulfoxide. A mild evolution of heat occurs. The mixture is allowed to react spontaneously for 5 minutes and then heated for 5 minutes at about 80° C. 3 - cyano - 2,5 - dioxo - 4 - (5 - phenylhydrazonomethyl-2-pyrryl)-3-pyrroline is precipitated as a dark purple dye by pouring the mixture onto well-stirred ice and water. The dye is then filtered and dried. Acetone solutions of this dye have absorption maxima at 578 and 347 millimicrons with molecular extinction coefficients of 15,200 and 14,300, respectively.

EXAMPLE XII

A solution of 18.5 parts of pyrrole-2-aldehyde phenylhydrazone in 180 parts of ethyl acetate is treated with 15.6 parts of 2-chloro-3-cyanomaleimide. Reaction is very fast and mildly exothermic. The mixture is allowed to stand for 30 minutes and then filtered. This yields 2 parts of 3-cyano-2,5-dioxo-4-(5-phenylhydrazonomethyl-2-pyrryl)-3-pyrroline having an absorption maximum at 579 millimicrons, extinction coefficient of 20,200. The solvent is evaporated from the filtrate, and the residual dye recrystallized from 2000 parts of glacial acetic acid. This yields 15 parts of dye having absorption maximum at 579 millimicrons, extinction coefficient of 25,000. A third fraction amounting to 1.5 parts is insoluble in the volume of solvent taken for recrystallization. This has an absorption maximum in acetone at 579 millimicrons, extinction coefficient of 24,400. The combined yield amounts to 61%.

*Analysis.*— Calc'd. for $C_{18}H_{15}N_5O_4$ (the monosolvate): C, 59.2; H, 4.12; N. 19.18. Found: C, 58.93; H, 4.09; N, 18.57.

EXAMPLE XIII

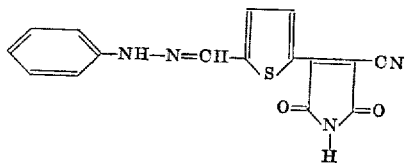

A solution of 10 parts of α-thenaldehyde phenylhydrazone in 945 parts of dimethylformamide is treated with 5 parts of 2-chloro-3-cyanomaleimide. 3-cyano-2,5-dioxo - 4 - (5 - phenylhydrazonomethyl - 2 - thienyl) - 3-pyrroline forms as a bright orange dye. This dye has an absorption maximum in acetone at 540 millimicrons.

EXAMPLE XIV

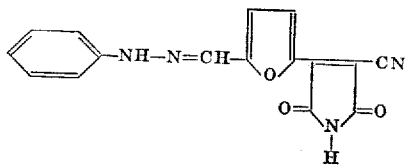

An ethyl acetate solution of 18.6 parts of furfural phenylhydrazone is treated with 15.6 parts of 2-chloro-3-cyanomaleimide. The reaction is rapid and mildly exothermic. The mixture is allowed to stand at room temperature for 30 minutes and then filtered to obtain 3-cyano-2,5-dioxo - 4 - (5 - phenylhydrazonomethyl - 2 - furyl) - 3-pyrroline. A small portion, A, is retained for spectral analysis and the bulk of the material is recrystallized from glacial acetic acid. A third portion, C, is not soluble in the 2000 parts of acetic acid taken for recrystallization. The three samples of dye have absorption maxima in acetone at 562 millimicrons and molecular extinction coefficients of 23,900, 24,200, and 24,800, respectively.

*Analysis.*—Calc'd. for $C_{16}H_{10}N_4O_3$: C, 62.75; H, 3.27; N, 18.30. Found: C, 62.77; H, 3.42; N, 17.38.

EXAMPLE XV

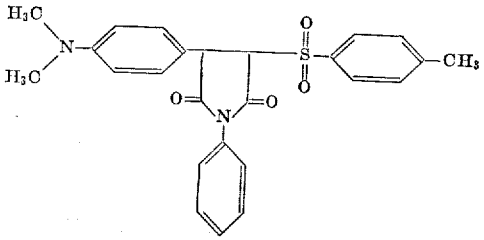

A suspension of 24.2 parts of 2,3-dichloro-N-phenylmaleimide in 142 parts of dimethylformamide is cooled to 15° C., and 25 parts of N,N-dimethylaniline is added followed by the addition of 18 parts of finely powdered, anhydrous sodium p-toluenesulfinate in small portions with stirring. The temperature increases to 32° C. After the exothermic reaction ceases and the mixture has cooled to 25° C., 100 parts of petroleum ether is added and the reaction mixture is diluted with ice water. The reaction mixture is filtered and the filter cake is washed with petroleum ether and water. The crude, air-dried material is dissolved in methylene chloride. The solution is filtered, concentrated to a small volume, and then anhydrous ether is added. A gummy material is obtained that solidifies when stirred with a small volume of methanol. Two crystallizations from a mixture of methylene chloride and ether give 22 parts of nearly black, glistening crystals of 3-(p-N,N-dimethylaminophenyl)-2,5-dioxo-1-phenyl-4-(p-toluenesulfonyl)-3-pyrroline that melts at 172–174° C. The molecular extinction coefficient in methylene chloride at 541 millimicrons is 23,600. The compound dyes cellulose acetate, polyethylene terephthalate and polyacrylonitrile fibers shades of purple, and dyes nylon, silk, and wool shades of brown.

*Analysis.*—Calc'd. for $C_{25}H_{22}O_4N_2S$: C, 67.23; H, 4.97, 6.28. Found: C, 67.20; H, 5.17, 6.56.

EXAMPLE XVI

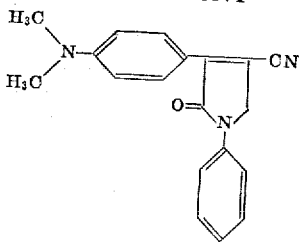

To a mechanically stirred solution of 72.6 parts of 2,3-dichloro-N-phenylmaleimide in 709 parts of dimethylformamide and 70 parts of N,N-dimethylaniline heated at about 80° C. is added 10 parts of finely powdered sodium cyanide during the course of 5 minutes. The reaction mixture is stirred and heated for an additional period of 35 minutes. After cooling to room temperature, the reaction mixture is diluted with petroleum ether and water. The solid material is collected, and washed with petroleum ether and water. The moist filter cake is taken up in methylene chloride and, after drying with anhydrous magnesium sulfate, is concentrated to a small volume and anhydrous ether is added. The crystalline material is collected, washed with ether, and crystallized a second and third time from methylene chloride and ether essentially as described above. The yield of 3-cyano-4-(p-N,N-dimethylaminophenyl)-2,5-dioxo-1-phenyl-3-pyrroline that melts at 223–225° C. is 5 parts. The molecular extinction coefficient in methylene chloride at 545 millimicrons is 29,000. The compound dyes cellulose acetate, polyethylene terephthalate and polyacrylonitrile fibers shades of purple, whereas nylon, silk and wool are dyed shades of brown.

*Analysis.*—Cal'd. for $C_{19}H_{15}O_2N_3$: C, 71.89; H, 4.77; N, 13.25. Found: C, 72.28; H, 5.09; N, 13.72.

EXAMPLE XVII

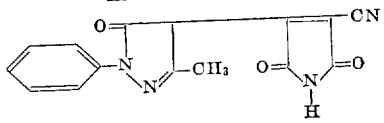

To 18.5 parts of 3-methyl-1-phenyl-5-pyrazolone in 157 parts of acetonitrile is added 15.6 parts of 2-chloro-3-cyanomaleimide with stirring. After 2 hours, 200 parts of water is added and the bright orange condensation product is collected on a filter; yield 13.4 parts (45%) of 3-cyano-2,5-dioxo-4-(3-methyl-1-phenyl-5-pyrazolon-4-yl)-3-pyrroline. An analytical sample is prepared by recrystallization from acetic acid. This product dyes cellulose acetate fabric yellow and wool and nylon fabrics magenta color.

*Analysis.*—Calc'd. for $C_{15}H_{10}N_4O_3$: C, 61.2; H, 3.4. Found: C, 61.6; H, 3.2.

EXAMPLE XVIII

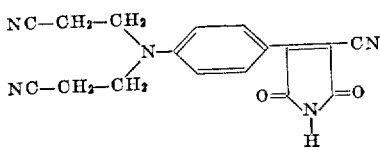

To a solution of 50 parts of N,N-bis(β-cyanoethyl)-aniline in 587 parts of acetonitrile is added 40 parts of 2-chloro-3-cyanomaleimide, and the solution is heated at 80°–100° C. for 3 hours. The solution is then cooled and the dark crystalline condensation product is collected; yield 48.6 parts (61%) of 3-cyano-4-[p-N,N-bis(β-cyanoethyl)amino-phenyl]-2,5-dioxo-3-pyrroline. An analytical sample is obtained by recrystallization from acetic acid. This product dyes cellulose acetate, nylon and wool fabric a red-orange color.

*Analysis.*—Calc'd. for $C_{17}H_{13}N_5O_2$: C, 63.9; H, 4.1; N, 21.9. Found: C, 64.8; H, 4.0; N, 21.8.

EXAMPLE XIX

Forty parts of 4-tricyanovinyl-N,N-dimethylaniline is dissolved in 413 parts of concentrated hydrochloric acid and stirred at 25° C. for 10 hours. The acid solution is poured onto well-stirred crushed ice. The solid separating is filtered and a portion recrystallized from glacial acetic acid. This yields (A) 2.6 parts of 3-cyano-4-(p-N,N-dimethylaminophenyl)-2,5-dioxo-3-pyrroline, a red dye having absorption maximum in acetone at 518 millimicrons with a molecular extinction coefficient of 28,600.

An additional 10 parts of this dye (B) is obtained by crystallizing the remainder of the crude dye from n-butyl alcohol (absorption maximum in acetone at 518 millimicrons with a molecular extinction coefficient of 25,300). This transformation proves that 2-chloro-3-cyanomaleimide condenses in the position para to the dialkylamino group in N,N-disubstituted anilines.

*Analysis.*—Calc'd. for $C_{13}H_{11}N_3O_2$: C, 64.7; H, 4.56; N, 17.42. Found (A): C, 65.17; H, 4.68; N, 17.48.

EXAMPLE XX

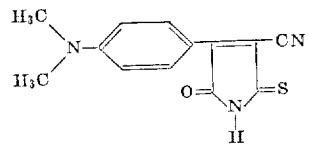

To a solution of 176 parts of the sodium salt of 4-cyano-3-hydroxy-2-oxo-5-thioxo-3-pyrroline in 783 parts of acetonitrile is added 478 parts of N,N-dimethylaniline and about 500 parts of phosphorus oxychloride. Within a few minutes a vigorous reaction occurs and the mixture turns deep blue in color. The reaction mixture is diluted with 4090 parts of 5% hydrochloric acid to precipitate 20 parts of 4-cyano-3-(p-N,N-dimethylaminophenyl)-2-oxo-5-thioxo-3-pyrroline in the form of a deep blue precipitate which is collected by filtration and dried.

EXAMPLE XXI

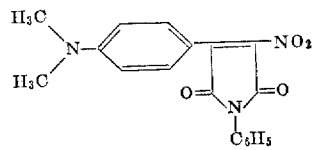

A solution of 484 parts of 2,3-dichloro-N-phenyl-maleimide in 2830 parts of N,N-dimethylformamide is stirred at 0°–5° C. while adding 240 parts of N,N-dimethylaniline. After 10 minutes 138 parts of sodium nitrate is added. Stirring at 0°–5° C. is continued for one hour. The reaction mixture is poured into a well-stirred mixture of ice and water to precipitate 3-(p-N,N-dimethylaminophenyl)-2,5-dioxo-4-nitro-1-phenyl-3-pyrroline. The bright green precipitate dye is collected by filtration, washed and dried. An acetone solution of this dye shows absorption maxima at 410 millimicrons and 725 millimicrons.

EXAMPLE XXII

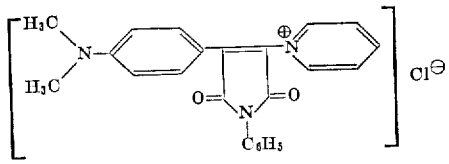

A mixture of 10 parts of 2,3-dichloro-N-phenyl-maleimide and 5 parts of N,N-dimethylaniline is dissolved in an excess of pyridine. The solution is heated at 80–100° C. for 10 minutes. N-[3-(p-N,N-dimethylaminophenyl)-2,5-dioxo-1-phenyl-4-pyrrolinyl]pyridinium chloride forms as a deep burgundy dye. This dye has absorption maxima at 353, 387 and 520 millimicrons.

The 3-hydroxy-2,5-dichalcogen-3-pyrrolines suitable for conversion via their sodium salts to the corresponding 3-chloro starting materials for this invention are the enol forms of the 2,3,5-trichalcogenpyrrolidines and 2,3,5-trichalcogenpyrrolylides shown by E. G. Howard in U.S. Patents 2,786,060 and 2,838,790.

When the process of Example IV is repeated using the following 3-hydroxy-2,5-dichalcogen-3-pyrrolines as their sodium salts in place of the sodium salt of 2-cyano-3-hydroxymaleimide and the following color-forming reactants in place of N,N-dimethylaniline, the indicated 2,5-dichalcogen-3-pyrrolines of this invention are obtained:

obvious modifications will occur to those skilled in the art.

Table I

| 3-hydroxy 2,5-dichalcogen-3-pyrroline (as sodium salt) | Color forming reactant (QH) | 2,5-dichalcogen-3-pyrroline product |
|---|---|---|
| 2,5 - dioxo - 3 - hydroxy - 1 - methyl - 4 - (N - methyl-carbamoyl)-3-pyrroline. | 2,6-dimethylphenol | 2,5 - dioxo - 3 - (p - hydroxy - m,m' - dimethyl - phenyl)-1-methyl-4-(N-methylcarbamoyl)-3 pyrroline. |
| 1 - allyl - 4 - (N - allylcarbamoyl) - 2,5 - dioxo - 3 - hydroxy-3-pyrroline. | ----do---- | 1 - allyl - 4 - (N - allylcarbamoyl) - 2,5 - dioxo - 3 - (p - hydroxy - m,m - dimethylphenyl) - 3 - pyrroline. |
| 2,5 - dioxo - 4 - ethoxycarbonyl - 3 - hydroxy - 3 - pyrroline. | 1 - acetyl - 2 - methyl - 2 - phenylhydrazine | 3 - [p - (2 - acetyl - 1 - methylhydrazino) - phenyl] - 2,5 - dioxo - 4 - ethoxycarbonyl - 3 - pyrroline. |
| 4 - acetyl - 2,5 - dioxo - 3 - hydroxy - 3 - pyrroline. | malononitrile | 4 - acetyl - 3 - dicyanomethyl - 2,5 - dioxo 3 - pyrroline. |
| 1 - dimethylcyclohexyl - 3 - (N - dimethylcyclohexyl-carbamoyl)-2,5-dioxo-4-hydroxy-3-pyrroline. | sodium salt of 1-naphthol-2-sulfonic acid | 1 - dimethylcyclohexyl - 4 - (N - dimethylcyclohexylcarbamoyl) - 2,5 - dioxo - 3 - (4 - hydroxy - 3 - sodiosulfo - 1 - naphthyl) - 3 - pyrroline. |
| 2,5 - dioxo - 1 - dodecyl - 3 - (N - dodecylcarbamoyl) - 4-hydroxy-3-pyrroline. | N-allyl-N-methylaniline | 3 - (p - N - allyl - N - methylaminophenyl) - 2,5 - dioxo-1-dodecyl-4-(N-dodecylcarbamoyl)-3-pyrroline. |
| 3 - acetyl - 2,5 - dioxo - 4 - hydroxy - 1 - phenyl - 3 - pyrroline. | N,N-dibenzylaniline | 3 - acetyl - 4 - (p - N,N - dibenzylaminophenyl) - 2,5-dioxo-1-phenyl-3-pyrroline. |
| 2,5 - dioxo - 3 - hydroxy - 1 - phenyl - 4 - (N - phenyl-carbamoyl)-3-pyrroline. | N-cyclohexyl-N-methyl aniline | 3 - (p - N - cyclohexyl - N - methylaminophenyl) - 2,5-dioxo-1-phenyl - 4 - (N - phenylcarbamoyl) - 3 - pyrroline. |
| 1 - cyclohexyl - 3 - (N - cyclohexyl carbamoyl) - 2,5 - dioxo-4-hydroxy-3-pyrroline. | N-methyl-N-propargylaniline | 1 - cyclohexly - 3 - (N - cyclohexylcarbamoyl) - 2,5 - dioxo - 4 - (N - methyl - N - propargylaminophenyl)-3-pyrroline. |
| 2,5 - dioxo - 3 - hydroxy - 1 - (2 - isopropyl - 5 - methyl - cyclohexyl) - 4 - (N - 2 - isopropyl - 5 - methylcyclohexylcarbamoyl)-3-pyrroline. | N,N-diethyl-alphanaphthylamine | 3 - (4 - N,N - diethylamino - 1 - naphthyl) - 2,5 - dioxo - 1 - (2 - isopropyl - 5 - methylcyclohexyl) - 4 - (N - 2 - isopropyl - 5 - methylcyclohexylcarbamoyl)-3-pyrroline. |
| 3 - benzoyl - 2,5 - dioxo - 4 - hydroxy - 1 - phenyl - 3 - pyrroline. | N,N-dibenzyl-alphanaphthylamine | 3 - benzoyl - 4 - (4 - N,N - dibenzylamino - 1 - naphthyl)-2,5-dioxo-1-phenyl-3-pyrroline. |
| 3 - carbamoyl - 2,5 - dioxo - 1 - isohexyl - 4 - hydroxy - 3 - pyrroline. | N,N-di(beta-ethoxyethyl)-aniline | 3 - carbamoyl - 4 - (p - N,N - di - [beta - ethoxyethyl] aminophenyl) - 2,5 - dioxo - 1 - isohexyl - 3 - pyrroline. |
| 1 - cyclohexyl - 2,5 - dioxo - 3 - (N,N - dimethylcarbamoyl)-4-hydroxy-3-pyrroline. | N,N - di - (beta - acetoxyethyl)aniline | 1 - cyclohexyl - 3 - (p - N,N - di - [beta - acetoxyethyl]aminophenyl) - 2, 5 - dioxo - 4 - (N,N - di - methylcarbamoyl)-3-pyrroline. |
| 4 - ethoxycarbonyl - 3 - hydroxy - 2 - oxo - 5 - thioxo - 3 - pyrroline. | N,N-dimethylaniline | 3 - (p - N,N - dimethylaminophenyl) - 4 - ethoxycarbonyl-2-oxo-5-thioxo-3-pyrroline. |
| 4 - (N, N - dimethylcarbamoyl) - 3 - hydroxy - 2 - oxo - 5-thioxo-3-pyrroline. | N,N-dioctadecylaniline | 4 - (N,N - dimethylcarbamoyl) - 3 - (p - N,N-dioctadecylaminophenyl)-2-oxo-5-thioxo-3-pyrroline. |
| 2,5-dioxo-3-hydroxy-4-pyridinium-3-pyrroline | N,N-dimethylaniline | 3 - (p - N,N - dimethylaminophenyl) - 2,5 - dioxo - 4 - pyridinium-3-pyrroline. |
| 2,5 - dioxo - 3 - hydroxy - 4 - trimethylammonium - 3 - pyrroline. | ----do---- | 3 - (p-N,N - dimethylaminophenyl) - 2,5 - dioxo - 4 - trimethylammonium-3-pyrroline. |
| 3 - dimethylsulfonium - 2,5 - dioxo - 4 - hydroxy - 3 - pyrroline. | ----do---- | 3 - ( p - N,N - dimethylaminophenyl) - 4 - dimethylsulfonium-2,5-dioxo-3-pyrroline. |
| 3-cyano-2,5-dithioxo-4-mercapto-3-pyrroline | ----do---- | 3 - cayno - 4 - (p - N,N - dimethylaminophenyl) - 2,5-dithioxo-3-pyrroline. |
| 2-cyano-3-hydroxymaleimide | N - (beta - benzoyloxyethyl) - N - methyl-aniline. | 3 - (p - N - [beta - benzoyloxyethyl] - N - methyl-phenyl)-4-cyano-2,5-dioxo-3-pyrroline. |
| Do | 3-(2-furyl)acrolein dimethylhydrazone | 3 - cyano - 4 - (5 - [3 - (dimethylhydrazono) - propenyl]-2-furyl)-2,5-dioxo-3-pyrroline. |
| Do | 3-(2-pyrryl)acrolein diethylhydrazone | 3-cyano-4-(5 - [3 - (diethylhydrazono) - propenyl] - 2-pyrryl)-2,5-dioxo-3-pyrroline. |
| Do | 3-(2-thienyl)acrolein dimethylhydrazone | 3 - cyano - 4 - (5 - [3 - (dimethylhydrazono) - propenyl] - 2 - thienyl) - 2,5 - dioxo - 3 - pyrroline. |
| Do | 3-methylsalicylamide of m-aminobenzaldehyde ethyleneglycol acetal. | 3 - cyano - 2,5 - dioxo - 4 - [3 - N - (m - 2 - dioxolanylphenyl)carbamyl - 4 - hydroxy - 2 - methyl - phenyl]-3-pyrroline. |

When the process of Example I is repeated using the following color forming reactants (QH) in place of N,N-dimethylaniline, the indicated 2,5-dioxo-3-pyrrolines are obtained.

Table II

| Color forming reactant (QH) | 2,5-dioxo-3-pyrroline product |
|---|---|
| β-(N-ethylanilino)ethyltrimethylammonium chloride. | β-(p-[3-cyano-2,5-dioxo-4-pyrrolinyl]-N-ethylanilino)ethyltrimethylammonium chloride. |
| β-(N-dodecylanilino)ethyltrimethylammonium chloride. | β-(p-[3-cyano-2,5-dioxo-4-pyrrolinyl]-N-dodecylanilino)ethyltrimethylammonium chloride. |
| β-(N-ethylanilino)ethyltriethylammonium chloride. | β-(p-[3-cyano-2,5-dioxo-4-pyrrolinyl]-N-ethylanilino)ethyltriethylammonium chloride. |
| β-(N-ethylanilino)ethyldimethylamine hydrochloride. | β-(p-[3-cyano-2,5-dioxo-4-pyrrolinyl]-N-ethylanilino)ethyldimethylamine hydrochloride. |
| β-(N-ethyl-α-naphthylamino)-ethyltriethylammonium chloride. | β-(p-[3-cyano-2,5-dioxo-4-pyrrolinyl]-N-ethyl-α-naphthylamino)-ethyltrimethylammonium chloride. |
| N-[β-N-(4,6-dichloro-1,3,5-triazino) aminoethyl]-N-ethylaniline. | 3-cyano-4-(p-N-[β-N-(4,6,dichloro-1,3,5-triazino)aminoethyl]-N-ethylaminophenyl)-2,5-dioxo-3-pyrroline. |

The foregoing detailed description has been given for clearness of understanding only and no unnecessary limitations are to be understood therefrom. The invention is not limited to the exact details shown and described, for The embodiments of the invention in which an exclusive property or privilege is claimed are defined as follows:

1. Compounds of the formula

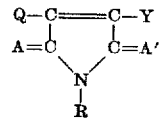

wherein A and A' are chalcogens of atomic number less than 17, Q being a member of the group consisting of

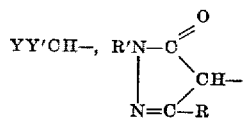

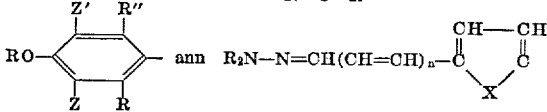

wherein Ar represents arylene which is hydrocarbon of 6 to 20 carbon atoms; R' is from 1 to 20 carbon atoms and is a member of the class consisting of hydrocarbon radicals, β-alkoxyethyl, β-acyloxyethyl where the acyl group contains only carbon and hydrogen in addition to the oxygen of the carbonyl group, β-cyanoethyl and β-trialkyl-ammoniumethyl halide; X is a member of the group consisting of O, S, and NR; Y and Y' are members of the group consisting of —CN, —COOR, —COR, —CONR$_2$, —CSNR$_2$, —SO$_2$R, —NO$_2$, —NR$_3^+$, and —SR$_2^+$; Z is a member of the group consisting of lower alkyl, halogen, —SO$_3$Na, and Y; Z' is a member of the group consisting of hydrogen and Z, and taken together with R" and the carbons to which Z' and R" are attached is the benzene ring; R and R" are members of the class consisting of hydrogen and hydrocarbon radicals of 1 to 20 carbon atoms; and n represents a cardinal number selected from the group consisting of 0 and 1.

2. 3-cyano-4-(p-N,N-dimethylaminophenyl)-2,5-dioxo-3-pyrroline.

3. 3-cyano-4-(p-N,N-diethylaminophenyl)-2,5-dioxo-3-pyrroline.

4. 3-cyano-2,5-dioxo-4-[5 - (3 - phenylhydrazonopropenyl)-2-furyl]-3-pyrroline.

5. 3-cyano-2,5-dioxo-4(3-methyl-1-phenyl-5-pyrazolon-4-yl)-3-pyrroline.

6. 3-cyano-4-[p-N,N - bis(β-cyanoethyl)aminophenyl]-2,5-dioxo-3-pyrroline.

7. Process which comprises reacting at a temperature of from 0° to 200° C. a member of the group consisting of 1-R-3-chloro-2,5-dichalcogen-3-pyrrolines and 1-R-4-chloro-2,5-dichalcogen-3-pyrrolines, wherein the chalcogens have atomic numbers less than 17, with a compound having the formula QH, in which Q is a member of the group consisting of R'$_2$NAr—, RCONHNRAr—, (R'$_2$NAr)$_2$C=CH—, YY'CH—

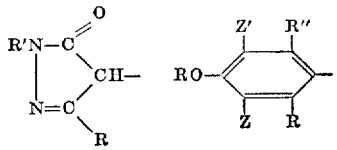

and

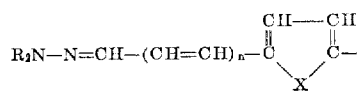

wherein Ar represents arylene which is hydrocarbon of 6 to 20 carbon atoms; R' is from 1 to 20 carbon atoms and is a member of the class consisting of hydrocarbon radicals, β-alkoxyethyl, β-acyloxyethyl where the acyl group contains only carbon and hydrogen in addition to the oxygen of the carbonyl group, β-cyanoethyl and β-trialkylammoniumethyl halide; X is a member of the group consisting of O, S, and NR; Y and Y' are members of the group consisting of —CN, —COOR, —COR, —CONR$_2$, —CSNR$_2$, —SO$_2$R, —NO$_2$, —NR$_3^+$, and —SR$_2^+$; Z is a member of the group consisting of lower alkyl, halogen, —SO$_3$Na, and Y; Z' is a member of the group consisting of hydrogen and Z, and taken together with R" and the carbons to which Z' and R" are attached is the benzene ring; R and R" are members of the class consisting of hydrogen and hydrocarbon radicals of 1 to 20 carbon atoms; and n represents a cardinal number selected from the group consisting of 0 and 1, and isolating the resulting 2,5-dichalcogen-3-pyrroline.

8. The process of claim 7 wherein an organic solvent inert to both reactants and products is employed as a reaction medium.

References Cited in the file of this patent

UNITED STATES PATENTS 2,205,558    Flett _____ June 25, 1940

OTHER REFERENCES

Bergmann: The Chemistry of Acetylene and Related Compounds, page 80 (1948).

UNITED STATES PATENT OFFICE
CERTIFICATE OF CORRECTION

Patent No. 3,096,339                  July 2, 1963

Elmore L. Martin

It is hereby certified that error appears in the above numbered patent requiring correction and that the said Letters Patent should read as corrected below.

Column 10, line 60, after "=CH-" insert a comma; lines 66 to 70, the formulas should appear as shown below instead of as in the patent:

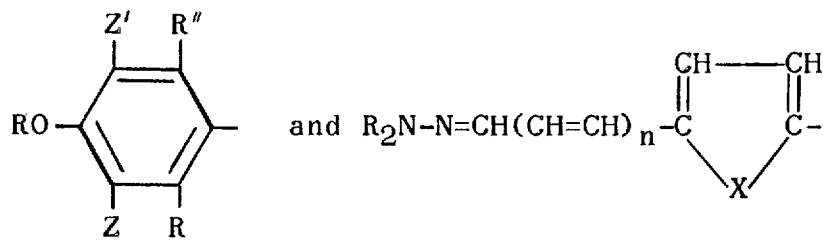

Signed and sealed this 5th day of May 1964.

(SEAL)
Attest:

ERNEST W. SWIDER                          EDWARD J. BRENNER
Attesting Officer                      Commissioner of Patents